United States Patent [19]

Carlson

[11] Patent Number: 5,396,425
[45] Date of Patent: Mar. 7, 1995

[54] VERTICAL VELOCITY INDICATOR

[75] Inventor: Christopher J. Carlson, Three Rivers, Mich.

[73] Assignee: The United States of America as represented by the Secretary of the Air Force, Washington, D.C.

[21] Appl. No.: 113,377

[22] Filed: Aug. 27, 1993

[51] Int. Cl.⁶ .............................................. G01C 21/00
[52] U.S. Cl. ................................. 364/424.06; 364/434; 364/435; 340/945
[58] Field of Search ................... 364/434, 435, 424.06; 340/966, 967, 973, 974, 979, 945, 946, 951, 953, 955, 958, 959, 963, 970, 971, 975, 977

[56] References Cited

U.S. PATENT DOCUMENTS

| | | | |
|---|---|---|---|
| 3,686,626 | 8/1972 | Bateman et al. | 340/27 NA |
| 3,970,829 | 7/1976 | Melvin | 235/150.22 |
| 4,040,005 | 8/1977 | Melvin | 73/178 T |
| 4,095,271 | 6/1978 | Muller | 364/434 |
| 4,326,189 | 4/1982 | Crane | 340/27 NA |
| 4,368,517 | 1/1983 | Lovering | 364/428 |
| 4,539,843 | 9/1985 | Wise | 73/179 |
| 4,845,495 | 7/1989 | Bollard et al. | 340/973 |
| 4,860,007 | 8/1989 | Konicke et al. | 340/979 |
| 5,001,638 | 3/1991 | Zimmerman et al. | 364/424.06 |
| 5,250,947 | 10/1993 | Worden et al. | 340/973 |

*Primary Examiner*—Kevin J. Teska
*Assistant Examiner*—Stephen J. Walder, Jr.
*Attorney, Agent, or Firm*—Bobby D. Scearce; Thomas L. Kundert

[57] ABSTRACT

A vertical velocity indicator for aircraft is described which comprises an inlet open to ambient static pressure; a pressure transducer communicating with the inlet for detecting changes in ambient static pressure and providing output signals corresponding to equilibrium with ambient pressure at level flight, a static pressure increase corresponding to rate of descent, and a static pressure decrease corresponding to rate of climb of the aircraft; a pitch gyroscope for detecting pitch of the aircraft and providing a corresponding output signal; a signal processor for the output signals from the pressure transducer and pitch gyroscope and a graphics generator operatively connected to a visual display of aircraft pitch and vertical velocity, the display including an aircraft silhouette defining aircraft pitch, and a color coded background and a preselected plurality of spaced level altitude lines which present preselected intervals of altitude and which move on the background at a rate corresponding to the rate of climb or descent of the aircraft, and a plurality of simulated cloud figures which move on the background with the lines for enhancing realism of the silhouette display and for minimizing reverse motion illusion associated with movement of the lines; and a digital display for presenting the numerical vertical velocity of the aircraft.

6 Claims, 2 Drawing Sheets

VERTICAL VELOCITY INDICATOR

RIGHTS OF THE GOVERNMENT

The invention described herein may be manufactured and used by or the Government of the United States for all governmental purposes without the payment of any royalty.

BACKGROUND OF THE INVENTION

The present invention relates generally to systems for displaying to an aircraft pilot information defining motion and attitude of the aircraft, and more particularly to an improved vertical velocity indicator combining a pictorial pitch indication against a simulated sky background with level altitude lines to accurately depict aircraft pitch attitude and vertical movement.

Existing vertical velocity indicators are generally difficult to read as to precise vertical velocity rates, and are most useful as qualitative indicators of climb or descent.

It is therefore a principal object of the invention to provide a simple and easily interpretable vertical velocity indicator.

It is a further object of the invention to provide a vertical velocity indicator combining pitch attitude and vertical rate.

It is a further object of the invention to provide a color coded vertical velocity indicator for informing the pilot of vertical direction.

These and other objects of the invention will become apparent as a detailed description of representative embodiments proceeds.

SUMMARY OF THE INVENTION

In accordance with the foregoing principles and objects of the invention, a vertical velocity indicator for aircraft is described which comprises an inlet open to ambient static pressure; a pressure transducer communicating with the inlet for detecting changes in ambient static pressure and providing output signals corresponding to equilibrium with ambient pressure at level flight, a static pressure increase corresponding to rate of descent, and a static pressure decrease corresponding to rate of climb of the aircraft; a pitch gyroscope for detecting pitch of the aircraft and providing a corresponding output signal; a signal processor for the output signals from the pressure transducer and pitch gyroscope and a graphics generator operatively connected to a visual display of aircraft pitch and vertical velocity, the display including an aircraft silhouette defining aircraft pitch, and a color coded background and a preselected plurality of spaced level altitude lines which present preselected intervals of altitude and which move on the background at a rate corresponding to the rate of climb or descent of the aircraft, and a plurality of simulated cloud figures which move on the background with the lines for enhancing realism of the silhouette display and for minimizing reverse motion illusion associated with movement of the lines; and a digital display for presenting the numerical vertical velocity of the aircraft.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
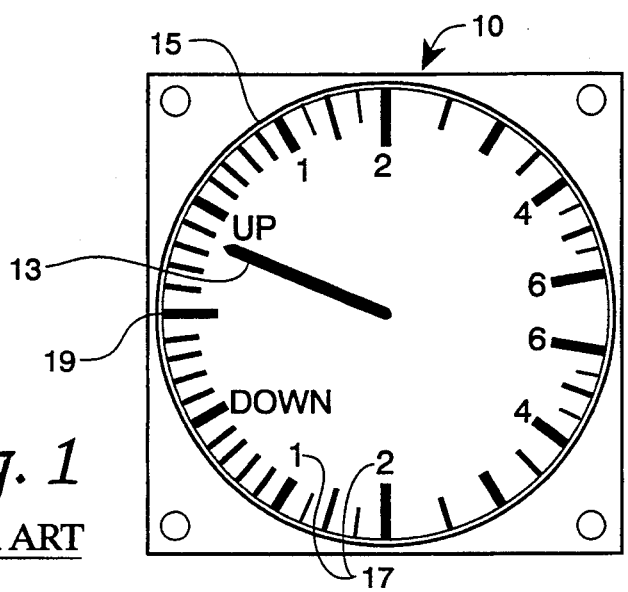
FIG. 1 is a drawing of a prior art instrument gauge configured to display vertical speed to the pilot.
Figure 2A:
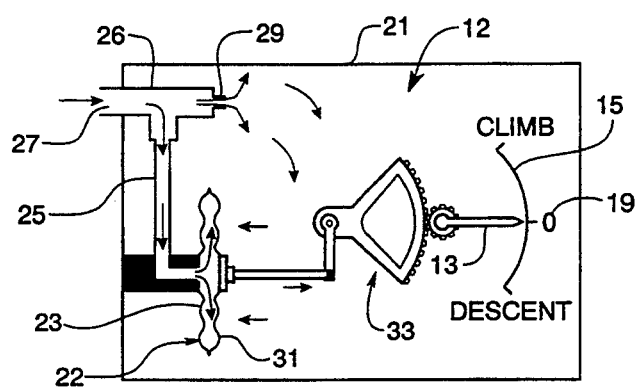
FIGS. 2a,2b,2c are simplified schematics of a representative drive mechanism for the FIG. 1 gauge for conditions of level flight, descent, and climb, respectively.
Figure 2B:
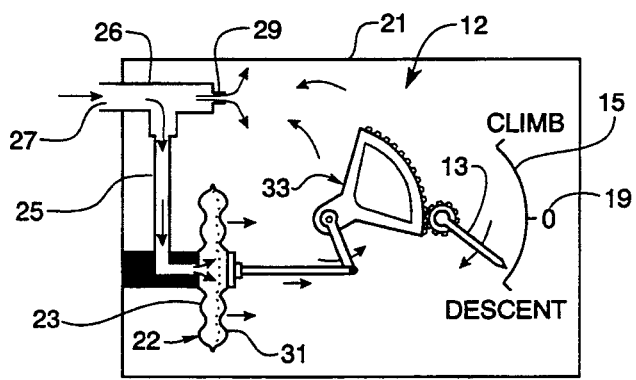
Figure 2C:
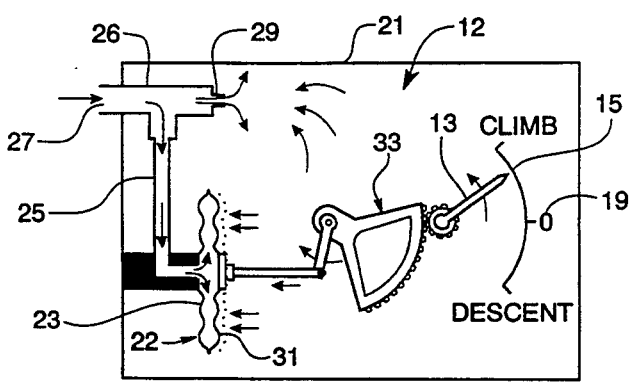

Referring now to the drawings, FIG. 1 shows a prior art instrument gauge 10 configured to display vertical speed to the pilot. FIGS. 2a,2b,2c are simplified drawings of a representative drive mechanism 12 for gauge 10 illustrating respectively positions for level flight, descent, and climb. Gauge 10 provides qualitative and quantitative data to the pilot by the UP or DOWN positions of needle 13 and calibrated dial 15 having indicia 17 (usually white numbers on black gackground) providing specific rate of descent or climb as a measure of needle 13 displacement from neutral position 19. Mechanism 12 typically comprises substantially sealed case 21 enclosing bellows 22 having fixed side 23 communicating through capillary 25 with static pressure metering unit 26 open to ambient at inlet 27. Metering orifice 29 separates the interior of case 21 and inlet 27. Movable side 31 of bellows 22 is operatively connected to needle 13 through mechanical connector means 33 through which needle 13 movement (rotation) is proportional to the corresponding extent of expansion or collapse of bellows 22. A null position knob (not shown) is usually included for setting needle 13 in the neutral position 19 at a level flight. In level flight, the interior of case 21 is in equilibrium with ambient pressure at inlet 27, bellows 22 is at a neutral position, and needle 13 is at a corresponding neutral position 19 suggested in FIG. 2a. When the aircraft descends, static pressure at inlet 27 increases at a rate corresponding to rate of descent, which generates a substantially constant differential pressure between case 21 interior and inlet 27 which causes expansion of bellows 22 and corresponding movement of needle 13 as suggested in FIG. 2b. When the aircraft climbs, static pressure at inlet 27 decreases at a rate corresponding to rate of climb, which generates substantially constant differential pressure between case 21 interior and inlet 27 which causes collapse of bellows 22 and corresponding movement of needle 13 as suggested in FIG. 2c. Calibration of dial 15 may allow the pilot to read climb or descent rates of about 0–1000 feet/min and to read less accurately greater rates.

In order to obtain an accurate awareness of aircraft situation utilizing information from gauge 10, the pilot must correlate data from gauge 10 with data from the altimeter, airspeed indicator and artificial horizon which, under instrument flight, fatigue, combat or emergency conditions, disorientation or low altitude maneuvers, may present an unacceptable mental burden on the pilot. Gauge 10 is often difficult to read, and must be interpolated to ascertain an accurate rate of climb or descent.

Figure 3:
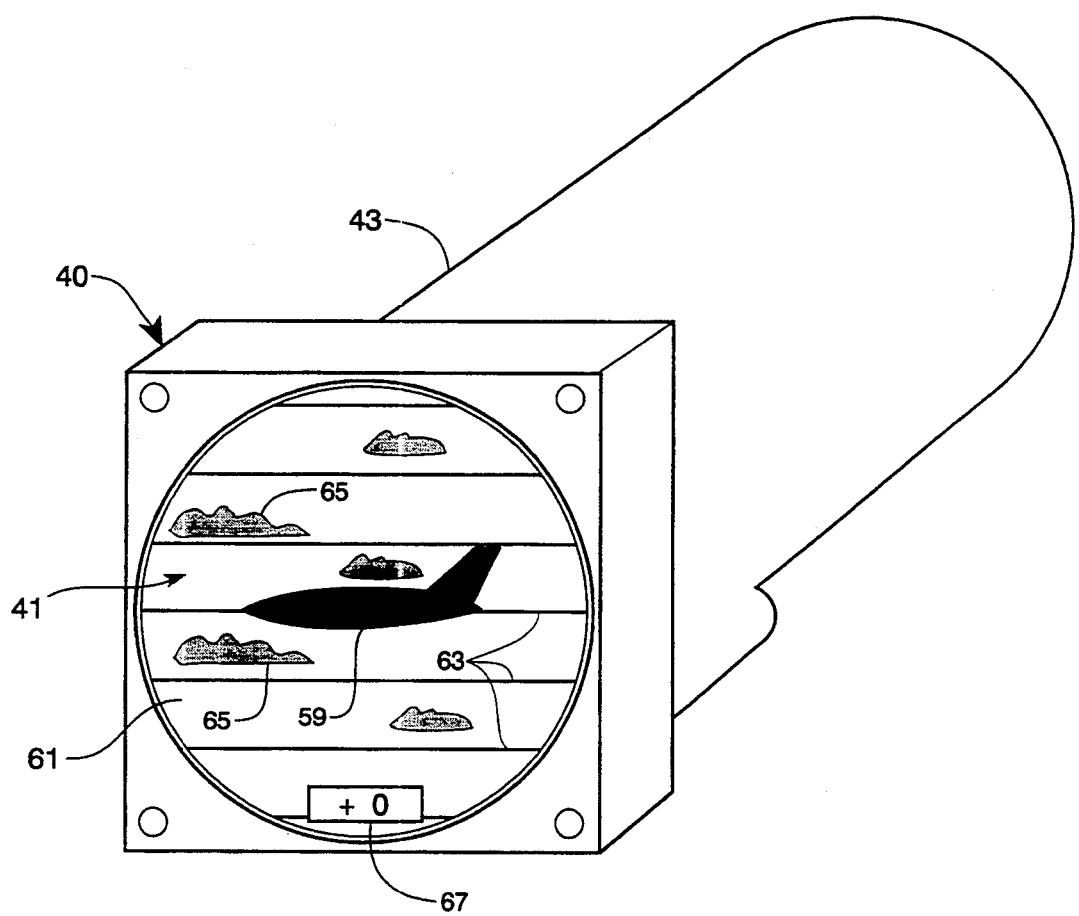
FIG. 3 is a perspective drawing of a representative vertical velocity indicator according to the invention.

Referring now to FIG. 3, a representative vertical velocity indicator 40 according to the invention is shown in perspective, and includes visual display 41 within housing 43 which may be sized for retrofit within the instrument panel of the aircraft at a position normally occupied by a conventional indicator. Display 41 combines visual aircraft pitch indication with a background which moves up and down at a rate corresponding to the vertical velocity of the aircraft. Accordingly, display 41 may be of any type as would occur to one skilled in the applicable art, such as an aircraft CRT (cathode ray tube), flat panel display, liquid crystal display, color light emitting diode, gas plasma or thin film electroluminescent display.

Figure 4:
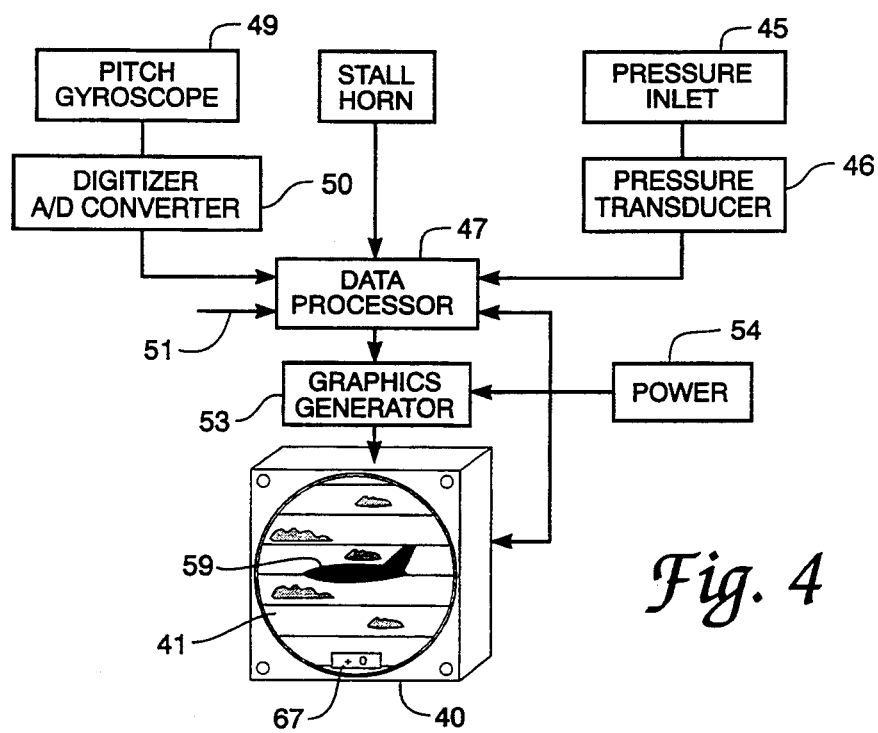
FIG. 4 shows the internal components of the FIG. 3 indicator.

Reference is now made additionally to FIG. 4 which shows the internal components of indicator 40. Static pressure inlet 45 open to ambient communicates with pressure transducer 46 to provide ambient pressure data to data processor 47 in the form of voltage, current or the like. Pitch gyroscope 49 is also operatively connected to data processor 47 through analog-to-digital digitizer/converter 50 and inputs aircraft orientation data to indicator 40. Inputs 51 to processor 47 may originate in the aircraft flight data computer (not shown) instead of or in addition to gyroscope 49 and pressure transducer 46. Information from data processor 47 is input to graphics generator 53 for generating display 41, and for providing a zero adjustment calibration for the vertical rate display. Power for operation of the components of indicator 40 may come from power source 54 such as a battery or other source aboard the aircraft.

Display 41 created by graphics generator 53 includes centrally displayed aircraft silhouette 59 which provides instant and accurate indication of aircraft pitch, as determined from pitch gyro scope 49, input 51 or other source as would occur to a skilled artisan by these teachings. Background 61 of display 41 contains a preselected plurality of level altitude lines 63 the presentation of which is controlled by data processor 47 through graphics generator 53. Lines 63 are spaced to present preselected intervals of altitude, such as flight levels of ten feet. When the aircraft climbs or descends, lines 63 move downwardly or upwardly on background 61 at a rate corresponding to the rate of climb or descent. For example, if the aircraft climbs at 100 ft/min, 10 lines/min pass on display 41. Simulated cloud FIGS. 65 may be displayed on background 61 to enhance realism of the view of silhouette 59 and to inhibit reverse motion illusion associated with rapid movement of lines 63. In a unit built in demonstration of the invention, the rate at which lines 63 move was limited to 160 per minute. Background 61 of display 41 is preferably color coded to provide a redundant signal as to direction of aircraft movement. Background 61 presented in blue may indicate climb, yellow may represent warning of descent, and red the onset of stall. Display 41 should have contrast or backlighting sufficient for readability in direct sunlight, e.g., a luminance ratio of about 1:3 between screen and the immediate surrounds. Presentation of silhouette 59, background 61 color, altitude lines 63 and cloud FIGS. 65 may be computer controlled as by the aircraft flight computer, data processor 47 or other suitable means.

A display of precise vertical aircraft speed is required to allow the pilot to comply with ground controller commanded altitudes, to estimate time to attain a selected altitude, to facilitate formation or low altitude flying, or the like. Digital display 67, operatively connected to data processor 47 through graphics generator 53, may therefore be included in display 41 to present continuously the absolute numerical vertical rate. Data displayed in 67 were not limited as the lines 63 in the demonstration. Data sampling and averaging may be performed (as by the air craft flight computer) to ensure that display 67 does not change too rapidly for the pilot to easily comprehend. For suitable low luminance (night) visibility, display 67 numerals should subtend a visual angle of at least 18 minutes (about 0.15 inch height at a 28-inch viewing distance); in the demonstration unit, display 67 numerals were selected at 0.2 inch in height.

The invention therefore provides an improved vertical velocity indicator for aircraft which provides to the pilot an instant and accurate assessment of aircraft vertical velocity and pitch with minimal mental workload. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A vertical velocity indicator for aircraft, comprising:
   (a) an inlet open to ambient;
   (b) a pressure transducer communicating with said inlet for detecting changes in ambient pressure and providing ambient pressure data signals corresponding to equilibrium with ambient pressure at level flight, a detected increase in static pressure corresponding to rate of descent, and a detected decrease in static pressure corresponding to rate of climb of said aircraft;
   (c) a pitch gyroscope for detecting pitch of said aircraft and providing an output signal corresponding to said pitch of said aircraft;
   (d) means for processing output signals from said pressure transducer and said pitch gyroscope;
   (e) an analog-to-digital digitizer/converter interconnecting said pitch gyroscope and said means for processing output signals for providing signals corresponding to pitch orientation of said aircraft;
   (f) graphics generator means; and
   (g) a visual display of said aircraft pitch and vertical velocity, said display being operatively connected to said means for processing output signals and said graphics generator means, said visual display including a side silhouette of said aircraft generated by said graphics generator means, the orientation of said side silhouette being controlled by said pitch gyroscope.

2. The vertical velocity indicator of claim 1 wherein said visual display comprises a cathode ray tube, flat panel display, liquid crystal display, color light emitting diode, gas plasma or thin film electroluminescent display.

3. The vertical velocity indicator of claim 1 wherein said visual display includes a background having a preselected plurality of level altitude lines the presentation of which is controlled by said signal processing means and said graphics generator means, said lines being spaced in said display to present preselected intervals of altitude, whereby said lines are movable on said background at a rate corresponding to the rate of climb or descent of said aircraft.

4. The vertical velocity indicator of claim 3 wherein said background includes a plurality of simulated cloud figures which move on said visual display with said lines.

5. The vertical velocity indicator of claim 4 wherein said background is color coded to provide a redundant signal to said pilot as to direction of movement of said aircraft.

6. The vertical velocity indicator of claim 1 wherein said visual display further includes a digital display operatively connected to said signal processing means and said graphics generator means for presenting continuously the numerical vertical velocity of said aircraft.

* * * * *